United States Patent Office 3,501,234
Patented Mar. 17, 1970

3,501,234
PROJECTOR FOR PHOTOGRAPHIC
TRANSPARENCIES
Hans Werner Johannsen, Frankfurt am Main, and Erich Hofmann, Kriftel, Germany, assignors to Braun Aktiengesellschaft, Frankfurt am Main, Germany
Filed Dec. 19, 1967, Ser. No. 691,903
Claims priority, application Germany, Dec. 22, 1966, B 90,423
Int. Cl. G03b 23/00
U.S. Cl. 353—104    20 Claims

ABSTRACT OF THE DISCLOSURE

A universal slide projector which can accept magazines for small or medium sized slides. The slide changer comprises a shaft which is movable sideways in parallelism with the optical axis toward or away from the guide channel and can move and turn two grippers provided with jaws which can engage slides to transport them to a projection position in which the center of a slide is located on the optical axis irrespective of the size of the slide. The jaws of at least one of the grippers are detachable from the respective gripper or are movable with reference to the remainder of such gripper, either by hand or in automatic response to sidewise displacement of the shaft of the slide changer so that they can properly engage a larger slide or a smaller slide.

BACKGROUND OF THE INVENTION

The present invention relates to projectors for photographic transparencies, commonly known as slide projectors, and more particularly to improvements in so-called universal projectors which can be used for presentation of differently dimensioned slides.

Universal slide projectors of conventional design comprise a housing provided with two guides or channels each of which can receive a magazine or tray for a certain type of slides. The guides are disposed at the opposite sides of the optical axis and the housing further accommodates two slide changers, one for each magazine. The slide changers are installed in separate planes and each thereof must place a slide into a different position with reference to the optical axis, i.e., the projecting position of a relatively large slide which is to be withdrawn from a magazine at one side of the optical axis is different from the projecting position of a relatively small slide which is to be withdrawn from the other magazine. A serious drawback of such slide projectors is that they occupy too much room and that they comprise a very large number of parts so that they are prone to malfunction and must be manufactured at a cost which is considerably higher than the cost of a projector for use with a single type of slides. Each such two-magazine projector must be equipped with two complete slide changers and with two magazine transporting units.

SUMMARY OF THE INVENTION

It is an important object of our invention to provide a novel and improved universal slide projector wherein a single slide changer suffices to move differently dimensioned slides between their magazine and a projecting position and wherein the dimensions of the housing need not exceed the dimensions of the housing in a conventional projector for use with a single type of slides.

Another object of the invention is to provide a novel housing for use in a slide projector of the just outlined character and to provide the housing with guide means capable of accepting, supporting and guiding magazines or trays for differently dimensioned slides.

A further object of the invention is to provide a novel slide changer for use in the improved universal slide projector and to construct and assemble the slide changer in such a way that it can transport small or large slides with equal facility and accuracy.

An additional object of the invention is to provide the slide projector with a novel and improved prime mover for the slide changer.

A concomitant object of the invention is to provide a slide projector of the above outlined character wherein the slide changer can be operated by hand or motorically.

Still another object of the invention is to provide a slide projector wherein the conversion of the slide changer for transportation of larger or smaller slides takes up little time, requires little effort, and can be carried out by persons having little technical skill or little experience with photographic equipment.

An ancillary object of the invention is to provide the slide changer with novel and improved slide engaging and transporting devices.

A further object of the invention is to provide a slide projector which can accept conventional magazines or trays.

In its simplest form, the slide projector of our invention is arranged to project images of two types of differently dimensioned slides which are stored in compartments of differently dimensioned magazines. The projector comprises a housing defining single guide means for magazines of two or more sizes, a slide changer comprising pivot means in the housing and grippers turnable with and relative to each other in a projection plane about the axis of the pivot means to transport individual slides between the compartments of a magazine in the guide means and a projecting position in which the center of the slide is located on the optical axis of the lens system of the projector, and shifting means for moving the pivot means sideways with reference to the housing to change the positions of grippers with reference to the guide means so that the grippers can move into engagement with and can properly transport slides of different dimensions in different positions of the pivot means. Each of the grippers comprises at least one slide engaging and/or supporting portion in the form of a jaw or the like, and the guide means preferably defines a channel and has one or more magazine engaging portions arranged to overlie, straddle or extend into a portion of a magazine which is inserted into the guide means.

The jaws of one of the grippers are preferably detachable from or are movable relative to the remainder of such gripper to place them into an optimum position for engagement with differently dimensioned slides. For example, such jaws may be coupled to each other by a pin-and-slot connection or the like so that one thereof is moved in automatic response to movement of the other jaw, or the two movable jaws can be operatively connected with the shifting means for the pivot means to change their positions with reference to each other and with reference to the remainder of the respective gripper in automatic response to actuation of the shifting means.

The prime mover of the slide projector is preferably an electric motor which shares sidewise movements of the pivot means and is connected therewith by a simple driving connection which can move the grippers back and forth with and relative to each other. It is also possible to replace the motor with a manually operated handle, crank, wheel or the like.

The novel features which are considered as characteristic of the invention are set forth in particular in the appended claims. The improved projector itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
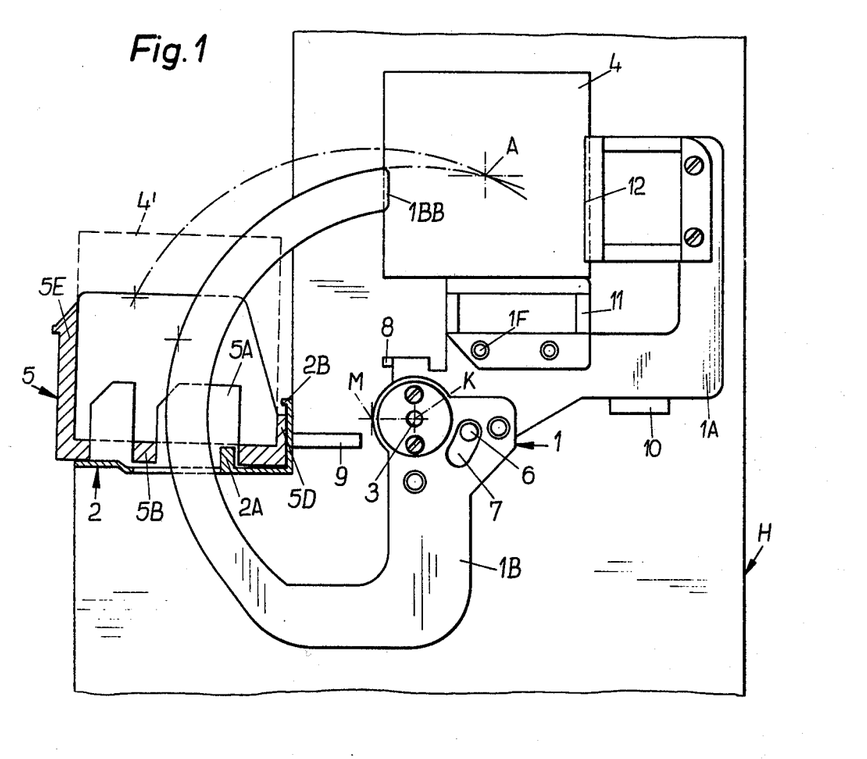
FIG. 1 is a fragmentary transverse vertical sectional view of a slide projector whose housing accommodates or supports a magazine for small slides and wherein the slide changer maintains a slide in projecting position.
Figure 2:
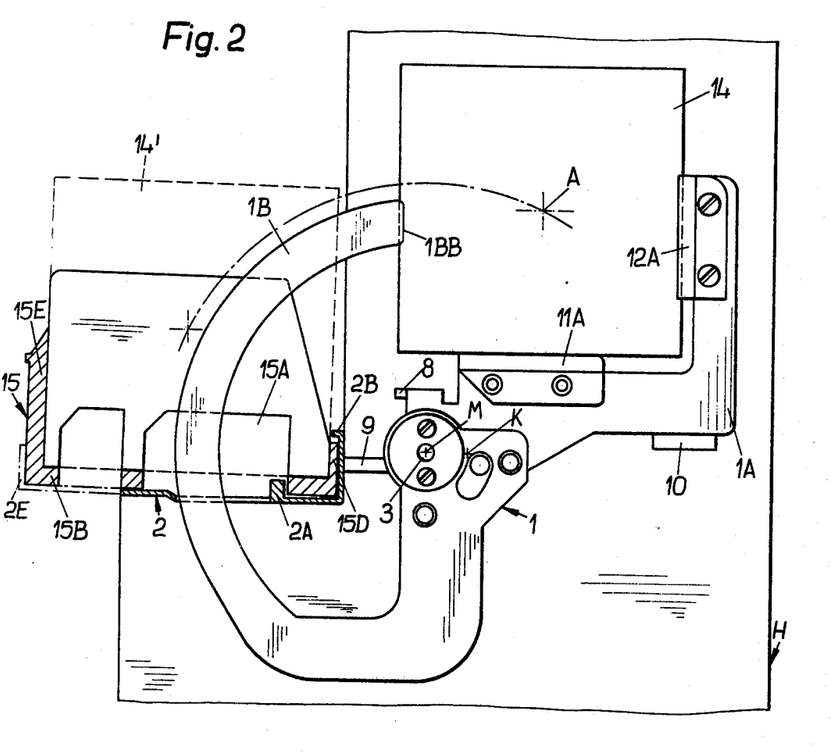
FIG. 2 illustrates the projector of FIG. 1 but with the slide changer in a position in which it can transport relatively large slides.
Figure 3:
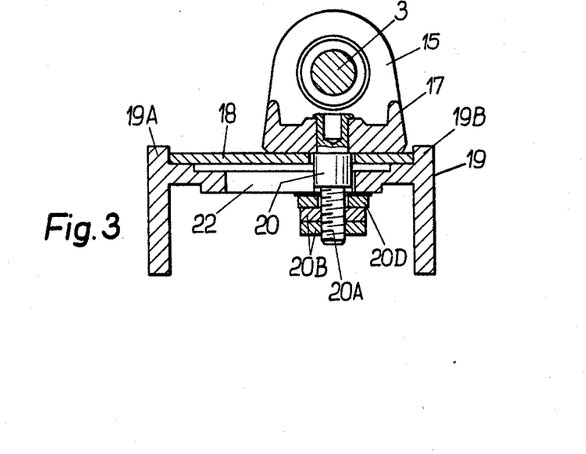
FIG. 3 is a fragmentary transverse vertical sectional view as seen in the direction of arrows from the line III—III of FIG. 5 and illustrates the shifting mechanism for the pivot means of the slide changer in a position in which the slide changer is ready to transport relatively small slides.

FIGS. 1 and 2 illustrate a portion of a slide projector which comprises a housing H supporting a horizontal pivot member or shaft 3 which forms part of a slide changer 1. This slide changer 1 further comprises a pair of slide transporting members or grippers 1A, 1B which are turnable with and relative to each other about the axis of the shaft 3. The housing H is formed with or carries a single guide or channel 2 for differently dimensioned magazines or trays 5 (FIG. 1) or 15 (FIG. 2). The grippers 1A, 1B are turnable together about the axis of the shaft 3 through about 90 degrees between the end positions shown in FIG. 1 or 2 and end positions which they assume upon rotation in a counterclockwise direction. These grippers are located in a projection plane which is parallel to the plane of FIG. 1 or 2 and is normal to the direction in which the magazine 5 or 15 is movable stepwise along the guide 2. The optical axis of the lens system of the slide projector is shown at A, this axis being normal to the plane of FIG. 1 or 2 and being parallel to the axis of the shaft 3. FIG. 1 illustrates a relatively small photographic transparency or slide 4 by solid lines in a projecting position in which its center is located on the optical axis A. In order to move this slide 4 to the broken-line position 4' of FIG. 1, i.e., back into the respective compartment of the magazine 5, the grippers 1A, 1B must turn in a counterclockwise direction so that the slide returns into the respective compartment. The mechanism which transports the magazine 5 or 15 stepwise along the guide 2 will be described later; the operation of the transporting mechanism is selected in such a way that the magazine 5 or 15 can move forwardly or backwards and comes to rest when a slide 4 or 14 (FIG. 2) is located in the projection plane. The guide 2 comprises a bottom wall which is provided with a rib or rail 2A entering an elongated slot 5A or 15A in the bottom wall 5B or 15B of the magazine 5 or 15 to prevent movement of the respective magazine in a direction at right angles to the shaft 3. The guide 2 is further provided with a side wall having a horizontal magazine engaging rib or rail 2B which is adjacent and parallel to the shaft 3 and overlies a side panel 5D or 15D of the magazine 5 or 15 to hold the latter against vertical movement with reference to the housing H. In this way, the guide 2 can properly accommodate larger or smaller magazines which respectively contain groups of larger or smaller slides 14 or 4. The dimensions of the panel 5D are the same as those of the panel 15D.

The gripper 1A is provided with a pin or post 6 which extends into an arcuate slot 7 of the gripper 1B. The length of the slot 7 (whose center of curvature is located on the axis of the shaft 3) determines the extent to which the gripper 1B can turn relative to the gripper 1A. The housing H is provided with two fixed stops 9 and 10 for the gripper 1A. The latter engages the stop 10 (see FIGS. 1 and 2) when a slide 4 or 14 is properly located in projecting position so that its center lies on the optical axis A. A projection 8 of the gripper 1A engages the stop 9 when the gripper 1A is turned through 90 degrees in a counterclockwise direction, as viewed in FIG. 1 or 2. The gripper 1B is free to move with reference to the gripper 1A when the latter is arrested by the stop 9, and such movability of gripper 1B with reference to gripper 1A is utilized to return a slide 4 or 14 to the position 4' or 14' in which the slide is properly located in the respective compartment of the magazines 5 or 15. When the gripper 1B continues to turn in a counterclockwise direction after the projection 8 of the gripper 1A engages the stop 9, the gripper 1B causes a torsion spring 3A (see FIG 5) to store energy. The spring 3A is installed in prestressed condition and serves to bias the gripper 1B in a clockwise direction so that the latter's slide-engaging portion or jaw 1BB biases the slide 4 or 14 against a slide-engaging portion or jaw 12 or 12A on the gripper 1A. When it turns in a clockwise direction, the gripper 1B moves its jaw 1BB from below through the slot 5A or 15A of the magazine 5 or 15, thereupon through that compartment of the magazine 5 or 15 which is located in the projection plane to lift the slide 4 or 14 (above the position 4' or 14') away from the bottom wall 5B or 15B and to bias the right-hand vertical edge face of the slide mount against the jaw 12 or 12A, and finally to the position shown in FIG. 1 or 2 wherein one edge face of the slide 4 or 14 rests on a slide supporting portion or jaw 11 or 11A provided on the gripper 1A. In this way, the slide 4 or 14 is gripped from three sides and is properly held in projecting position in which its center lies on the optical axis A. The jaws 11, 12 or 11A, 12A make an angle of 90 degrees with each other. When the projection 8 of the gripper 1A abuts against the stop 9 and the gripper 1B is moved all the way in a counterclockwise direction, the jaw 1BB is located at a level below the bottom wall 5B or 15B so that the transporting mechanism can advance the magazine 5 or 15 forwardly or backwards. When the gripper 1A assumes the position shown in FIG. 1 or 2, it bears against the stop 10 and its jaw 12 or 12A maintains the right-hand edge face of the mount of the slide 4 or 14 in a vertical plane. The jaw 11 or 11A then maintains the lower edge face of the mount on the slide 4 or 14 in a horizontal plane. At the same time, the jaw 1BB bears against the lefthand edge face of the respective mount. Since the gripper 1B is biased by the aforementioned torsion spring 3A, the slide 4 or 14 is properly held in projecting position and remains in such position until the shaft 3 is caused to turn in a counterclockwise direction.

For example, the compartments of the magazine 5 may be dimensioned to accommodate small slides with 2 x 2 mounts, and the compartments of the magazine 15 may accommodate medium sized slides with 2¾ x 2¾ mounts.

In accordance with an important feature of our invention, the shaft 3 of the slide changer 1 is shiftable sideways to move its axis between the positions M and K. When in the position K, the shaft 3 maintains the grippers 1A, 1B in optimum positions for transport of small slides 4 (see FIG. 1), i.e., the jaws 1BB, 11 and 12 then cooperate to place the centers of slides 4 onto the optical axis A when the slides 4 are moved to the solid-line positions one of which is shown in FIG. 1. On the other hand, and if the axis of the shaft 3 is shifted to the position M, the jaws 1BB, 11A and 12A can cooperate to move larger slides 14 between the respective compartments of the magazine 15 and the projecting positions in such a way that the center of each larger slide 14 is also located on the optical axis A. The jaws 11, 12 of FIG. 1 are removable from the gripper 1A and can be replaced by the jaws 11A, 12A. It is also possible to construct the jaws 11, 12 and 11A, 12A in such a way that that the jaws 11A, 12A are permanently installed on the gripper 1A and that the jaws 11, 12 can be attached to or over the jaws 11A, 12A when the user replaces a magazine 15 with a magazine 5. The dimensions of jaws 11, 12 and 11A, 12A are selected in such a way that they can properly engage the adjoining edge faces of mounts on slides 4 and 14 when the slides are lifted by the jaw 1BB of the gripper 1B. When the jaw 1BB of the gripper 1B begins to leave its lower end position (below the bottom wall 5B or 15B of the magazine 5 or 15), the jaw 11 or 11A extends vertically and is adjacent to the side panel 5D or 15D so that the slide 4 or 14 slides along the jaw 11 or 11A until its mount reaches the jaw 12 or 12A. From then on, the grippers 1A, 1B turn in a clockwise direction as a unit and ultimately reach the end positions shown in FIGS. 1 and 2. Shifting of the shaft 3 to move its axis from the position M to the position K or vice versa causes the grippers 1A, 1B to change their positions with reference to the guide 2 to the extent necessary to insure that the jaws 1BB, 11, 12 or 1BB, 11A, 12A properly engage and hold the mounts of smaller or larger slides.

The gripper 1A is preferably provided with suitable detent means for releasably holding the detachable jaws 11A, 12A in requisite positions. Such detent means may comprise spring biased balls 1F two of which are shown in FIG. 1. The jaws 11A, 12A are smaller than the jaws 11, 12 because, when the axis of the shaft 3 assumes the position K, the gripper 1A is nearer to the guide 2 for the magazines 5, 15. The distance between the positions M and K equals half the difference between the widths of slides 4 and 14.

The dimensions of the right-hand portion of the magazine 15 are identical with those of the right-hand portion of the magazine 5. This insures that each of these magazines can be properly engaged and guided by the rails 2A, 2B of the guide 2. The jaw 1BB of the gripper 1B can pass through the slot 5A or 15A with equal clearance. If the dimensions of the right-hand portion of the magazine 15 are not identical with those of the right-hand portion of the magazine 5, the guide 2 can be provided with a left-hand side wall 2E (indicated in FIG. 2 by phantom lines) which engages the outer side of the left-hand side panel 15E of the magazine 15 to hold the latter against uncontrolled sidewise movement with reference to the shaft 3, i.e., the side wall 2E is externally adjacent to that side of the magazine 15 which faces away from the shaft 3. No such left-hand side wall is normally needed for proper guidance of the left-hand side panel 5E of the smaller magazine 5.

FIGS. 3 to 6 illustrate the shifting means for the shaft 3 of the slide changer 1. The shaft 3 is mounted in two annular bearings 15, 16 provided at the ends of an elongated plate-like carrier 17. The latter is movable sideways (at right angles to the optical axis A) with reference to a base plate or table 18 mounted in a frame or carriage 19. The table 18 is slidable lengthwise in the frame 19 but the latter comprises two upwardly extending ledges 19A, 19B which are parallel to the optical axis and hold the table 18 against sidewise movement. The bearing assembly including the parts 15–17 is provided with two follower pins 20, 21 which extend downwardly through transverse horizontal cam slots 22, 23 provided in the frame 19 and through substantially S-shaped cam slots 24, 25 provided in the table 18. The lower end portions 20A, 21A of follower pins 20, 21 are threaded and mesh with pairs of locking nuts 20B, 21B located below elastic washers 20D, 21D which hold the follower pins against axial movement. The washers 20D, 21D are inserted between the lock nuts 20B, 21B and the underside of the frame 19. The table 18 is provided with a further transverse slot 26 for an eccentric motion transmitting pin 28 provided on a disk 27 turnable in a suitable recess of the frame 19. The latter comprises a downwardly extending bearing sleeve 30 for the shaft 29 of the disk 27, and the lower end portion of the shaft 29 is pinned or keyed to an actuating member or knob 33 having a rib 33A for more convenient engagement by the fingers of the person manipulating the projector. The frame 19 is mounted on a portion 32 of the housing H, and the latter comprises a bottom wall 31 through which the knob 33 extends.

Figure 4:
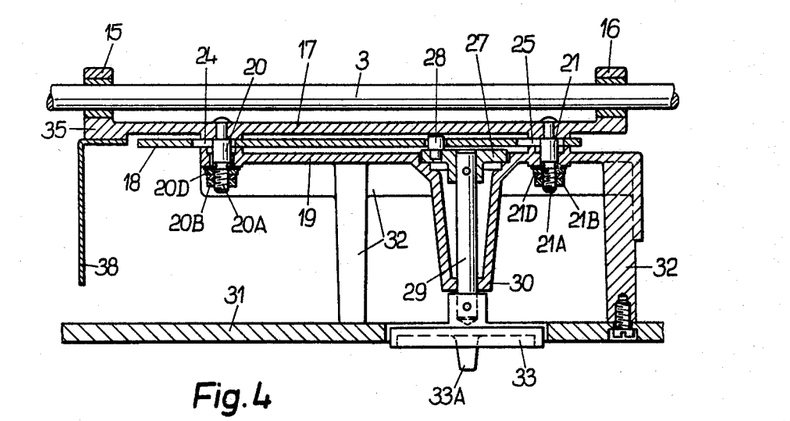
FIG. 4 is a fragmentary vertical sectional view as seen in the direction of arrows from the line IV—IV of FIG. 5 and illustrates the actuating means of the shifting mechanism for the slide changer.
Figure 5:
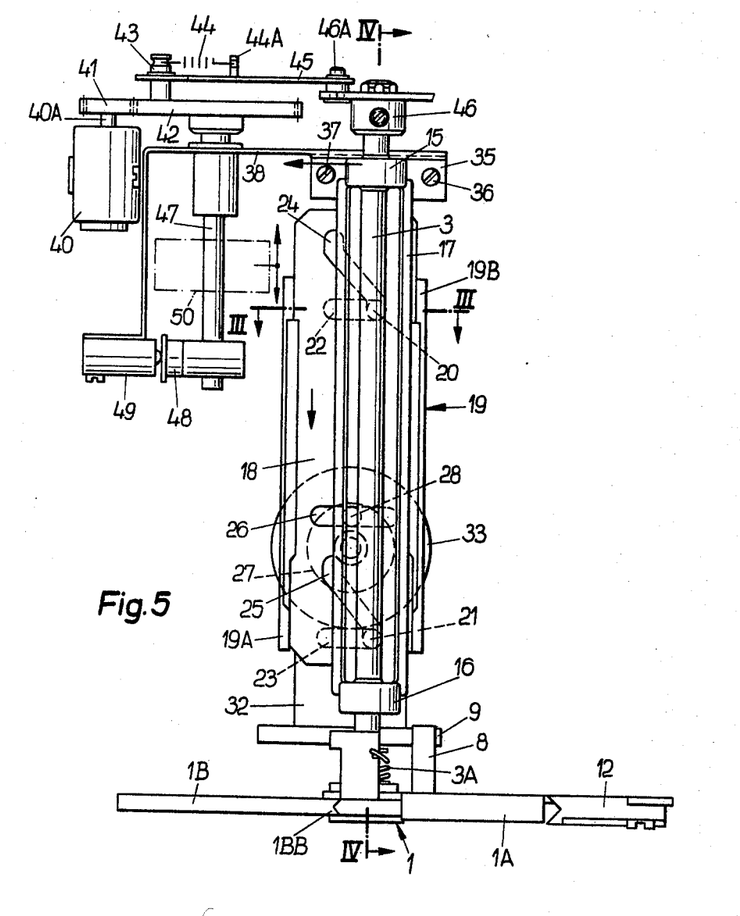
FIG. 5 is a top plan view of the shifting mechanism and slide changer, the pivot means of the slide changer being shown in a position it assumes when the slide changer is ready to transport relatively small slides.
Figure 6:
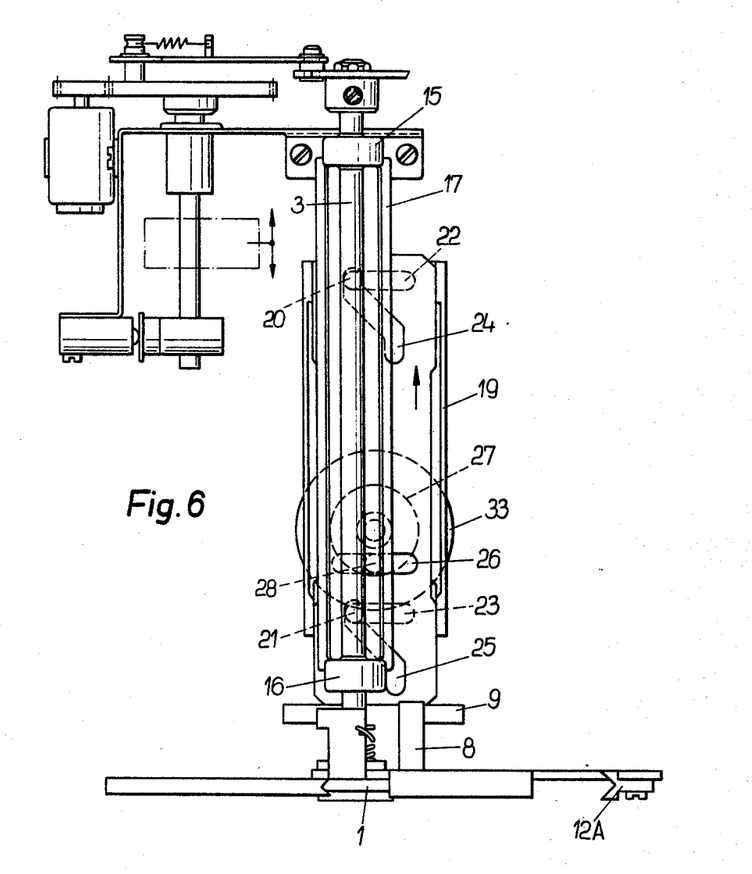
FIG. 6 is a similar top plan view but showing the pivot means in another position in which the slide changer can transport relatively large slides.

FIGS. 4 and 5 illustrate the shifting means in a position it assumes when the axis of the shaft 3 is held in the position K corresponding to that necessary to transport small slides 4 (FIG. 1). If the knob 33 is turned through 180 degrees, the axis of the shaft 3 is moved to the position M so that the grippers 1A, 1B are ready to transport larger slides 14. Such position of the shaft 3 is illustrated in FIG. 6. When the operator turns the knob 33, the motion transmitting pin 28 of the disk 27 travels in the transverse slot 26 and causes the table 18 to move between the ledges 19A, 19B of the frame 19 in parallelism with the optical axis A. The table 18 is arrested when it reaches the position shown in FIG. 6. During such turning of the knob 33, the follower pins 20, 21 respectively travel in the slots 22, 24 and 23, 25 and cause the bearing assembly 15–17 to move the shaft 3 from the position of FIG. 5 to that shown in FIG. 6. The shaft 3 moves sideways, i.e., at right angles to the optical axis A, and moves its axis from the position K (FIG. 1) to the position M (FIG. 2). The housing H may be provided with detent means for yieldably holding the knob 33 in the two angular positions corresponding to the two positions of the shaft 3.

The carrier 17 is rigid with a block 35 which is adjacent to the bearing 15 and is attached to a substantially L-shaped bracket 38 by means of screws or bolts 36, 37. The bracket 38 carries a preferably reversible electric motor 40 and a step-down transmission including gears 41, 42 which latter form part of a driving connection between the output shaft 40A of the motor 40 and the shaft 3 of the slide changer 1. This operative connection further comprises an eccentric crank pin 43 on the gear 42 of the transmission 41, 42 and a connecting rod 45 which is articulately connected to the crank pin 43 and to a second crank pin 46A on a wheel 46 fixed to one end of the shaft 3. A prestressed spring 44 operates between the crank pin 43 and a stationary retainer 44A of the housing H to compensate for eventual play between the parts of the driving connection. The articulate connection between the connecting rod 45 and the pin 43 and/or 46A is of the pin-and-slot type to compensate for the difference between the throws of the pins 43 and 46A. When the motor 40 is started, the connecting rod 45 turns the shaft 3 back and forth to move the grippers 1A, 1B about the axis of the shaft 3. The shaft 47 of the gear 42 is journalled in the bracket 38 and carries a face cam 50 (indicated in FIGS. 5 and 6 by phantom lines) which constitutes a motion receiving portion of the aforementioned transporting mechanism for the magazine 5 or 15. The details of the transporting mechanism form no part of the present invention. For example, the cam 50 can drive a ratchet-and-pawl assembly which in turn drives a pinion meshing with a customary rack provided on the magazine 5 or 15. The ratchet wheel of the just mentioned assembly is then dimensioned in such a way that it can receive motion from the cam 50 in both end positions of the shafts 3 and 47.

The shaft 47 of the gear 42 further carries an actuating member or trip 48 which can engage a master switch 49 in the electric circuit of the motor 40 to open the switch upon completion of a slide change.

An important advantage of the structure shown in FIGS. 5 and 6 is that the motor 40 and the driving connection between the output shaft 40A and shaft 3 share the movements of shaft 3 with reference to the frame 19. This renders it possible to drive the shaft 3 by means of a very simple connection which comprises a small number of parts. Were the motor 40 rigidly secured to the housing H, the operative connection between its output shaft 40A and the shaft 3 would be much more complicated and more expensive. However, we do not wish to exclude the use of a fixedly mounted motor.

Figure 7:
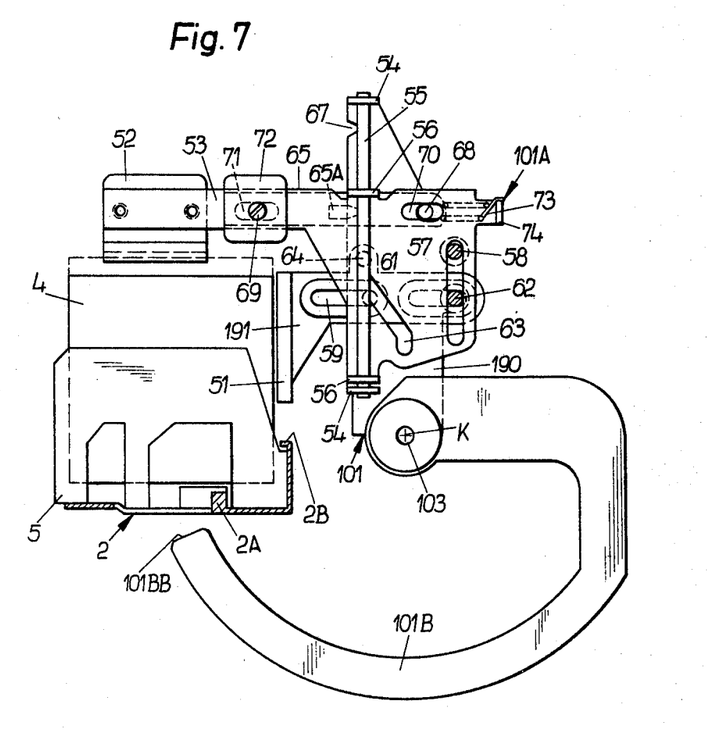
FIG. 7 is a fragmentary transverse vertical sectional view of a second slide projector wherein the slide changer is set up to transport relatively small slides and wherein the grippers of the slide changer are shown in idle positions.
Figure 8:
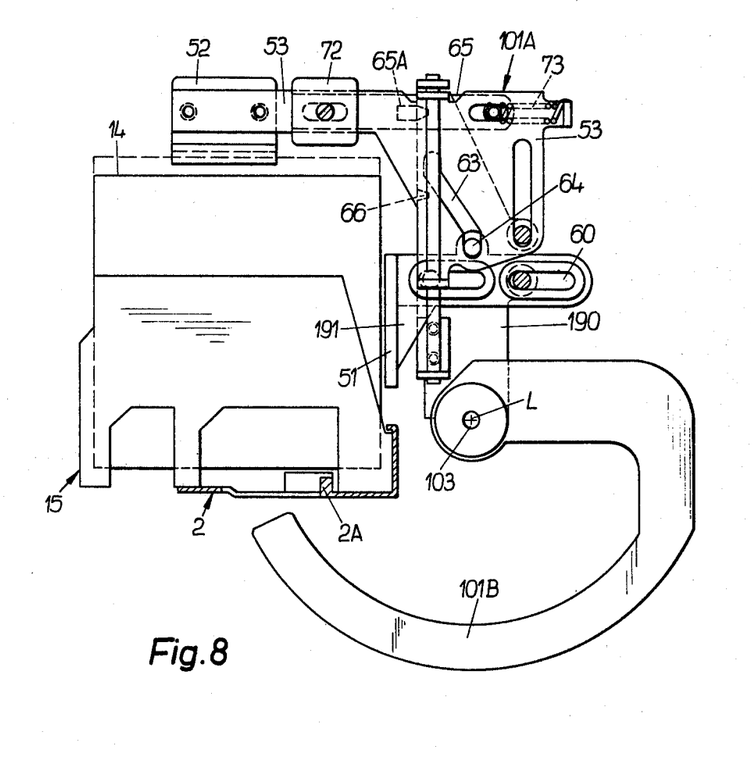
FIG. 8 is a similar sectional view of the second projector but showing the grippers of the slide changer in idle positions and with their slide engaging portions ready to engage and to transport relatively large slides.

FIGS. 7 and 8 illustrate certain parts of a modified slide projector. This projector, too, can be used for presentation of smaller slides 4 (FIG. 7) or larger slides 14 (FIG. 8). The construction of the guide 2 for the magazine 5 or 15 is the same as described in connection with FIGS. 1 and 2, and the grippers 101A, 101B of the slide changer 101 are movable with and relative to each other in the same way as the grippers 1A, 1B. The same applies for the manner in which the axis of the shaft 103 of the slide changer 101 is movable sideways between the positions K and L respectively shown in FIGS. 7 and 8. The main difference between the projectors of FIGS. 1–6 and 7–8 is that the jaws 51, 52 of the gripper 101A are adjustable in such a way that they can be used for transportation and retention of slides 4 or 14. In contrast to FIGS. 1 and 2, the grippers 101A, 101B of FIGS. 7 and 8 are illustrated in their idle or inoperative positions in which the jaw 101BB of the gripper 101B is located at a level below the guide 2 so that the magazine 5 or 15 can be moved lengthwise of the guide to place a selected slide 4 or 14 into the projection plane. If the shaft 103 of the slide changer 101 is thereupon rotated in a clockwise direction, as viewed in FIG. 7 or 8, the jaw 101BB of the gripper 101B engages the lower edge face of the mount on the adjoining slide 4 or 14 and moves the slide upwardly along the jaw 51 and against the jaw 52 of the gripper 101A. The latter gripper moves its projection 8 (FIG. 1) away from the stop 9 of the housing when the gripper 101B continues to turn in a clockwise direction so that the slide 4 or 14 is transported to projecting position in which its center lies on the optical axis of the lens system of the projector.

The gripper 101A has an arm 190 which is turnable about the axis of the shaft 103 and carries two eyes or lugs 54 for a pintle 55. Two eyes or lugs 56 of a second arm 53 of the gripper 101A are slidable along the pintle 55 and this second arm carries the jaw 52 so that the latter is movable in parallelism with the pintle 55. The latter extends substantially radially of the shaft 103. The arm 53 is formed with an elongated slot 57 which is parallel to the pintle 55 and receives a guide pin 58 of the arm 190. The pin 58 cooperates with the pintle 55 and eyes 56 to insure accurate guidance of the jaw 52 and arm 53 relative to the arm 190. The pin 58 is preferably provided with a head (not shown) which prevents turning of the arm 53 about the axis of the pintle 55.

The jaw 51 of the gripper 101A is mounted on a third arm 191 provided with two elongated slots 59, 60 for guide pins 61, 62 provided on the arm 190. The slots 59, 60 extend at right angles to the pintle 55. The arms 53, 191 are connected to each other by a coupling including a pin 64 on the arm 191 and a substantially S-shaped slot 63 in the arm 53. The arrangement is such that the jaw 51 moves in a direction to the left, as viewed in FIG. 8, when the arm 53 is caused to move downwardly, and vice versa. In order to reduce friction, the edges bounding the slots 59, 60 of the arm 191 are beaded as shown in FIGS. 7 and 8.

The gripper 101A is further provided with a releasable locking device which can maintain the jaws 51, 52 in the positions shown in FIG. 7 or 8. This locking device comprises a slidable locking member 65 (hereinafter called bolt for short) having a projection or tooth 65A adapted to extend into either one of two notches or recesses 66, 67 provided in the arm 190. The bolt 65 has two pins 68, 69 which respectively extend into elongated slots 70, 71 of the arm 53. The pin 69 is connected with a handle or knob 72 which facilitates the user's work in moving the bolt 65 against the opposition of a helical return spring 73 operating between the pin 68 and a retainer 74 on the arm 53 to bias the tooth 65A toward the notch 66 or 67. The pin 68 has a head which cooperates with the handle 72 to prevent wobbling of the bolt 65.

In order to change the position of jaws 51, 52, the user must engage the handle 72 to move the bolt 65 in a direction to the left, as viewed in FIG. 7 or 8, i.e., to withdraw the tooth 65A from the notch 66 or 67 against the opposition of the return spring 73. The arm 53 is then moved with reference to the pintle 55 to assume the position shown in FIG. 7 or 8 whereby the tooth 65A respectively registers with the notch 66 or 67. The pin-and-slot connection 63, 64 causes the jaw 51 to move with its arm 191 relative to the arm 190 and arm 53 so as to assume an optimum position for engagement with a smaller slide 4 or with a larger slide 14. The operator thereupon manipulates the knob 33 (FIGS. 4 to 6) to shift the shaft 103 from the position of FIG. 7 to that of FIG. 8 or vice versa.

It is clear that the jaws 51, 52 of the gripper 101A can be coupled with the shifting mechanism for the shaft 103 in such a way that they automatically assume the positions respectively shown in FIGS. 7 and 8 when the axis of the shaft 103 respectively assumes the positions K and M. The operative connection between the jaws 51, 52 and the shifting mechanism may comprise a system of cams, link trains, gear trains, electromagnets or other suitable motion transmitting assemblies. An advantage of jaws 51, 52 is that they cannot be lost or misplaced because they are permanently connected to the remainder of the gripper 101A.

Furthermore, the prime mover 40 of FIGS. 5 and 6 can be omitted if the designer wishes to simplify the construction of the slide projector. All that is needed is to provide the shaft 3 or 103 with a suitable handle, wheel or crank which enables the user to move the grippers 1A, 1B or 101A, 101B between operative and inoperative positions. Since the housing H must be provided with a single guide 2 which can accept different types of magazines or trays, the dimensions of the housing need not exceed those of a housing in a conventional slide projector which can be used for presentation of a single type of slides.

The shifting mechanism for the shaft 3 or 103 of the slide change 1 or 101 can be designed in such a way that it can move the shaft between three or more positions so that the projector can be used for presentation of three or more types of slides.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

1. In an apparatus for projecting images of differently dimensioned slides which are stored in compartments of differently dimensioned magazines, a combination comprising a housing defining single guide means for said magazines; a slide changer comprising pivot means in said housing and grippers turnable with and relative to each other in a projection plane about the axis of said pivot means to transport individual slides between the compartments of a magazine in said guide means and a projecting position in which the center of a slide is located on the optical axis of the lens system of the apparatus; and shifting means for moving said pivot means and said grippers with reference to said housing to change the positions of said grippers with reference to said guide means so that the grippers can move into engagement with and can transport slides of different dimensions in different positions of said pivot means.

2. A combination as defined in claim 1, wherein each of said grippers comprises at least one slide engaging portion.

3. A combination as defined in claim 2, wherein said guide means comprises a magazine engaging portion adjacent to and parallel with said pivot means.

4. A combination as defined in claim 3 for use with magazines adapted to accommodate differently dimensioned slides and having identical panels adjacent to said pivot means when received in said guide means, said magazine engaging portion of said guide means comprising a rail which overlies the panel of a magazine in said guide means.

5. A combination as defined in claim 2 for use with magazines having bottom walls and elongated slots in such bottom walls, wherein said guide means comprises a portion extending into the slot of a magazine in said guide means.

6. A combination as defined in claim 2, wherein said guide means comprises a portion externally adjacent to that side of a magazine in said guide means which is remote from said pivot means.

7. A combination as defined in claim 2, wherein one of said grippers comprises at least one slide engaging portion which is movable with reference to the remainder of said one gripper.

8. A combination as defined in claim 7, wherein said one slide engaging portion is detachable from the remainder of said one gripper so that said one gripper can engage slides of a first size when said one portion is attached and slides of another size when said one portion is detached.

9. A combination as defined in claim 7, wherein said one gripper comprises at least two slide engaging portions making a right angle with each other.

10. A combination as defined in claim 9, wherein said slide engaging portions of said one gripper are jaws movable relative to each other and with reference to the remainder of said one gripper between plural positions in each of which they can engage and hold a differently dimensioned slide.

11. A combination as defined in claim 10, further comprising coupling means providing an articulate connection between said jaws and arranged to move one of said jaws in response to movement of the other jaw.

12. A combination as defined in claim 1, wherein said shifting means comprises a bearing assembly turnably supporting said pivot means and frame means supporting said bearing assembly for movement at right angles to said optical axis.

13. A combination as defined in claim 12, further comprising a prime mover movable with said bearing assembly and a driving connection provided between said prime mover and said pivot means and arranged to turn said pivot means and said grippers back and forth to thereby move slides into and from a magazine in said guide means.

14. A combination as defined in claim 13, wherein said driving connection comprises a crank drive and a step-down transmission.

15. A combination as defined in claim 13, further comprising transporting means for moving a magazine with reference to said guide means, said transporting means comprising a motion receiving portion mounted on said driving connection.

16. A combination as defined in claim 13, wherein said prime mover is an electric motor and wherein said driving connection comprises means for arresting said motor in a predetermined angular position of said pivot means.

17. A combination as defined in claim 12, wherein said shifting means further comprises manually operated actuating means for moving said bearing assembly and said pivot means with reference to said frame means.

18. A combination as defined in claim 17, wherein said actuating means comprises a shaft and a motion transmitting member eccentrically mounted on said shaft and operatively connected with said bearing assembly.

19. A combination as defined in claim 1, wherein one of said grippers comprises several slide engaging portions movable between plural positions in response to movement of said pivot means so that said slide engaging portions can engage and hold differently dimensioned slides in each position of said pivot means.

20. A combination as defined in claim 1, wherein said guide means defines a channel which is parallel to said optical axis and wherein said pivot means is movable in a horizontal plane, one of said grippers being arranged to engage slides from below and the other gripper being arranged to engage slides from above and at one side in response to turning of said pivot means to move said grippers from an idle position to an operative position corresponding to the projection position of a slide.

References Cited

UNITED STATES PATENTS

| | | | |
|---|---|---|---|
| 2,982,177 | 5/1961 | Briskin et al. | 353—103 |
| 3,395,473 | 8/1968 | Deeg et al. | 40—79 |

HARRY N. HAROAIAN, Primary Examiner

U.S. Cl. X.R.

353—115, 118